US008832288B1

(12) United States Patent
Mahkovec et al.

(10) Patent No.: US 8,832,288 B1
(45) Date of Patent: Sep. 9, 2014

(54) TRANSITIONS BETWEEN REMOTELY CACHED AND LIVE VERSIONS OF A WEBPAGE

(75) Inventors: Ziga Mahkovec, San Francisco, CA (US); Samarth Keshava, San Francisco, CA (US); Jered Wierzbicki, San Francisco, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 13/587,658

(22) Filed: Aug. 16, 2012

Related U.S. Application Data

(60) Provisional application No. 61/671,610, filed on Jul. 13, 2012.

(51) Int. Cl.
| | | |
|---|---|---|
| *G06F 15/16* | (2006.01) | |
| *G06F 17/00* | (2006.01) | |
| *G06F 3/00* | (2006.01) | |
| *G06F 17/30* | (2006.01) | |
| *H04L 29/08* | (2006.01) | |

(52) U.S. Cl.
CPC ...... *G06F 17/30902* (2013.01); *H04L 67/2847* (2013.01)
USPC ............ 709/229; 715/205; 715/206; 715/738

(58) Field of Classification Search
CPC .................. G06F 17/30902; H04L 67/2847
USPC .................. 709/229; 715/205, 206, 760, 738
See application file for complete search history.

(56) References Cited

U.S. PATENT DOCUMENTS

| | | | | |
|---|---|---|---|---|
| 7,499,996 | B1 * | 3/2009 | Buchheit et al. | 709/224 |
| 7,882,538 | B1 * | 2/2011 | Palmer | 726/1 |
| 8,219,633 | B2 * | 7/2012 | Fainberg et al. | 709/213 |
| 2001/0020248 | A1 * | 9/2001 | Banga et al. | 709/219 |
| 2004/0107296 | A1 * | 6/2004 | Donker et al. | 709/245 |
| 2005/0198191 | A1 * | 9/2005 | Carlson et al. | 709/217 |
| 2008/0104198 | A1 * | 5/2008 | Kamath et al. | 709/217 |
| 2008/0184128 | A1 * | 7/2008 | Swenson et al. | 715/738 |
| 2010/0161717 | A1 * | 6/2010 | Albrecht et al. | 709/203 |
| 2011/0093790 | A1 * | 4/2011 | Maczuba | 715/745 |
| 2012/0221931 | A1 * | 8/2012 | Gleadall et al. | 715/208 |
| 2012/0221932 | A1 * | 8/2012 | Gleadall et al. | 715/208 |

OTHER PUBLICATIONS

Co-pending, U.S. Appl. No. 13/775,478 inventors Mahkovec, Z., et al., filed Feb. 25, 2013. (Not Published).

* cited by examiner

*Primary Examiner* — Hieu Hoang
(74) *Attorney, Agent, or Firm* — Sterne, Kessler, Goldstein & Fox P.L.L.C.

(57) ABSTRACT

Methods, systems and computer-readable storage mediums encoded with computer programs executed by one or more processors for transitioning between remotely cached and live versions of a webpage are disclosed. A primary webpage including a link to a secondary webpage is received. A cached version of the secondary webpage is requested prior to receiving a selection of the link. The cached version of the secondary webpage is provided responsive to the selection of the link. A live version of the secondary webpage is requested in parallel with the providing of the cached version. The cached version of the secondary webpage is transitioned to the live version. Upon a completion of the transitioning, the live version of the secondary webpage is provided.

23 Claims, 4 Drawing Sheets

TRANSITIONS BETWEEN REMOTELY CACHED AND LIVE VERSIONS OF A WEBPAGE

CROSS-REFERENCE TO RELATED APPLICATIONS

This application claims the benefit of U.S. Provisional Application No. 61/671,610, filed Jul. 13, 2012, to Mahkovec et al., entitled "Transitions Between Remotely Cached And Live Versions Of A Webpage," which is incorporated by reference.

BACKGROUND

Embodiments herein relate generally to transitioning between different versions of a webpage.

With the advancement of technology and the increase in available bandwidth, users have come to expect instantaneous or near-instantaneous responsiveness from applications, including web applications and web sites. For example, a user operating a browser to view a particular webpage may select one of the webpage's hyperlinks to view a different webpage. This selection directs the browser to request the selected webpage from a network server. The user then waits until the browser receives and displays the requested webpage content.

While this process may occur relatively quickly, the process is also exposed to numerous potential sources for delays that could force the user to have to wait an extended period of time between the time the user selects a hyperlink, and the time the browser has received and is able to display the selected webpage. For example, such delays may be caused by a content-intensive webpage, reduced network speed including limited bandwidth availability, and a limited availability of processing resources in either the network device hosting the webpage or the device operating the browser requesting the webpage. Such delays however, regardless of the reason, may cause the user to become impatient, forgo viewing the webpage, or otherwise degrade the user browsing experience.

BRIEF SUMMARY

Some aspects of the subject matter described in this specification may be embodied in a computer-implemented method. As part of the method, a primary webpage is received, the primary webpage including a link to a secondary webpage. A cached version of the secondary webpage is requested prior to receiving a selection of the link. The cached version of the secondary webpages is provided responsive to the selection of the link. A live version of the secondary webpage is requested in parallel with the providing of the cached version of the secondary webpage. The provided cached version of the secondary webpage is transitioned to the live version.

Other embodiments include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present disclosure makes reference to illustrative embodiments for particular applications, it should be understood that embodiments are not limited thereto. Other embodiments are possible, and modifications can be made to the embodiments within the spirit and scope of the teachings herein, and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

The speed at which a browser is able to render a webpage may be based on any number of factors, including the available network bandwidth, the size and complexity of the content of the webpage, and the technological capacity and availability of both the device requesting the webpage and the network device hosting the webpage. Despite the numerous factors and complexities involved in displaying a selected webpage in a browser, Internet (and other network) users often expect webpages to load quickly, often nearly instantaneously. Long delays in loading a requested webpage may cause users to grow impatient, forgo visiting requested webpages, and degrade the overall user browsing experience.

In a webpage with links (e.g., hyperlinks) to other webpages, a conventional browser waits until a user selects one of the links before requesting the corresponding webpage from a network server. As referenced above, this approach is susceptible to a wide array of factors that may cause delays in loading the selected webpage. These delays may result in a degraded user browsing experience, which could cause the user to forgo waiting for the requested webpage and instead request a different webpage.

Figure 1:
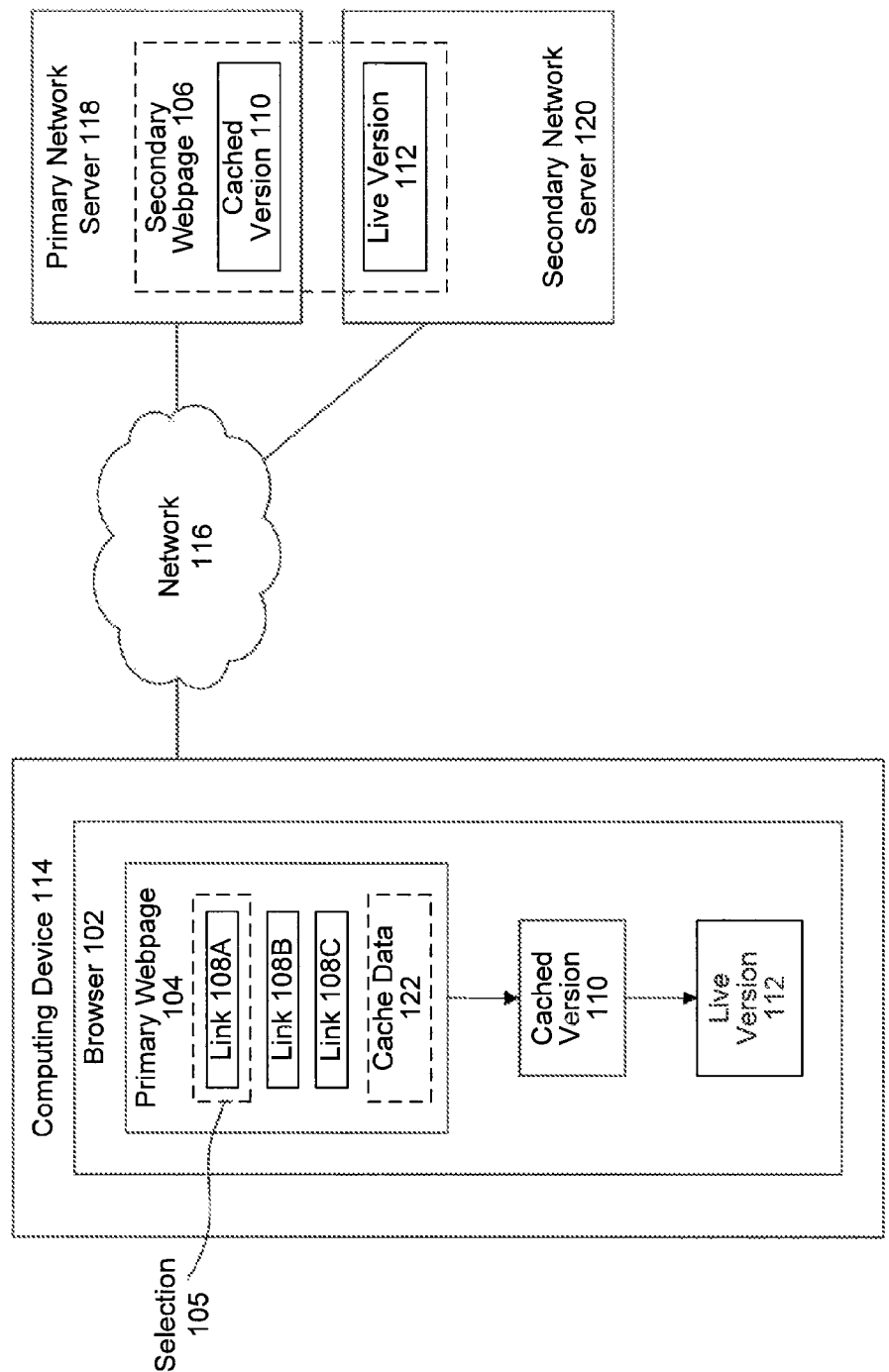
FIG. 1 is a block diagram illustrating a system for transitioning between remotely cached and live versions of a webpage, according to an embodiment.

FIG. 1 is a block diagram illustrating a system 100 for transitioning between remotely cached and live versions of a webpage, according to an embodiment. Browser 102 pre-fetches or requests remotely cached versions 110 of webpages, often before they are selected by a user for viewing. Cached version 110 of a webpage may be a full or partial version of the webpage that may have been previously rendered or requested and saved or cached. In an embodiment, cached version 110 may include a stored or cached document object model (DOM) of a particular webpage that may have been provided by a host server of the webpage in response to a request for the webpage.

By pre-fetching cached versions 110 of webpages corresponding to links 108 on a currently displayed webpage 104, browser 102 may quickly serve or render cached version 110 of a requested webpage for a user while requesting a live or updated version 112 of the webpage from the server hosting the webpage (e.g., secondary network server 120). Browser 102 may thereby allow the user to see or otherwise interact with cached version 110, while live version 112 is being requested or received from secondary network server 120. In an embodiment, cached version 110 and live version 112 may exist on primary network server 118 and secondary network server 120, respectively, and may be viewed on computing device 114 using browser 102.

Browser 102 may be a software application, such as a web browser, that a user uses to browse or otherwise interact with webpages, including primary webpage 104. Browser 102 may be used to browse documents (e.g., webpages, images, video, audio, etc.) on the Internet or other networks. Browser 102 may retrieve, traverse, and present information received over a network 116.

Primary webpage 104 may by any webpage with one or more links 108. For example, primary webpage 104 may be a webpage requested by a user (e.g., by entering a HTTP address for the webpage or selecting a saved bookmark) using browser 102. In another example embodiment, primary webpage 102 may be a search results page, provided to browser 102 in response to a query entered by a user. Then for example, links 108 direct browser 102 to the various webpages or other documents returned as part of the search results.

Links 108 may be hyperlinks, addresses, or pointers to one or more other documents or secondary webpages 106. A user may have an option of selecting any of links 108 provided on primary webpage 104. For example, a user may use a mouse to select a link 108, or on a touch-screen device may tap the image of link 108 as displayed in browser 102. Links 108 may be textual links, or may be embedded within images or other objects of primary webpage 104. A selection of any of links 108 may cause browser 102 to request the corresponding secondary webpage 106 for display in the same or existing window/tab of browser 102, or in a new window/tab of browser 102.

Secondary webpage 106 may be any webpage associated with a link or pointer on primary webpage 104. Secondary webpage 106 may or may not be directly associated with primary webpage 104. For example, if primary webpage 104 is the home screen of a news website, links 108 may be directed to secondary webpages 106 for various articles or news stories presented by (e.g., associated with) the news website. Or, for example, secondary webpage 106 may be the webpage to which browser 102 is directed upon the selection of an image or advertisement on primary webpage 104 with an embedded image. The advertisement may be for a product or service that is not directly sponsored by or associated with the hosting website.

As referenced above, primary webpage 104 may be a search results webpage provided in response to a user query. Links 108 may then point to secondary webpages 106 which may be hosted by different secondary servers 120 or websites. Secondary webpage 106 may also include links 108 (not shown), which may be the same as or different from links 108 on primary webpage 104.

A secondary webpage 106 may exist as both a live version 112 and a cached version 110. Live version 112 may be the version of a webpage that browser 102 would receive in response to a request from a server hosting the webpage (e.g., secondary network server 120). For example, conventional browsers, upon receiving a selection of a hyperlink, will request live version 112 over a network 116 and provide live version 112 for a user after live version 112 is received.

Cached version 110, by contrast, may be a previously stored or cached version of a webpage. Cached version 110 may be stored separately or remotely from live version 112. For example, cached version 110 may have been previously received from secondary network server 120 in response to a request for secondary webpage 106, and stored on a primary network server 118 or another server that is separate from secondary network server 120.

Webpages may be updated at any time, and some webpages may be constantly changing. As such, between the time cached version 110 is stored on primary network server 118 and live version 112 is requested in response to a selection 105 of link 108A, secondary webpage 106 may have changed or otherwise been updated. If secondary webpage 106 was updated after cached version 110 was stored, then cached version 110 will not include the updates that would be included in live version 112. If however, secondary webpage 106 was not updated between the time cached version 110 was saved and when selection 105 was received, cached version 110 may be identical to live version 112.

Cached version 110 may be a previously stored, captured, rendered, or otherwise provided version of secondary webpage 106. For example, cached version 110 may be captured any time prior to a receipt of selection 105. In an embodiment, cached version 110 may be captured or stored by a network crawler that periodically crawls or otherwise requests various secondary webpages 106 and stores one or more of the received objects of the secondary webpages 106 as cached versions 110.

Cached version 110 may include any varying amount of detail of a particular secondary webpage 106. Cached version 110 may include only select portions of secondary webpage 106. For example, cached version 110 may be a text only version of secondary webpage 106, or may exclude images or other multimedia that exceed a particular size. In an embodiment, for a webpage that rapidly changes, cached version 110 may only include those elements or objects of the webpage that are deemed to be constant, such as the background color, layout, and company logo. For a webpage that may be more constant (e.g., with less frequent updates), more of the webpage may be selected for cached version 110.

Different webpages may have different change or update rates. For example, while some webpages may be constantly changing, such as those that track the prices of equities trading on any of the world-wide markets, other webpages may change far less often, such as company webpages or webpages for a particular product. Or, for example, certain webpages may be designed to recognize certain user characteristics and may change based on this user information (e.g., such as recognizing a cookie, or a user location). As such, primary network server 118 may not cache a secondary webpage 106 that is personalized on a user-by-user basis, or may not cache those personalized portions of secondary webpage 106. Based on this change rate and webpage personalization, for example, primary network server 118 may or may not cache a secondary webpage 106. Or for example, primary network server 118 may cache only a portion of secondary webpage 106.

Live version 112 of secondary webpage 106 may be the most up-to-date version of secondary webpage 106 as provided by secondary network sever 120 (i.e., the server hosting secondary webpage 106). As referenced above, depending on when secondary webpage 106 was previously updated and when cached version 110 was stored, there may be differences between cached version 110 and live version 112 of secondary webpage 106.

In an embodiment, primary network server 118 may provide browser 102 with both the information to render primary webpage 104 and cache data 122. Cache data 122 may include any information that allows browser 102 to determine for which secondary webpage(s) to request cached versions 110. For example, cache data 122 may include a determination, as provided by primary network server 118, as to whether or not a particular secondary webpage 106 corresponding to a link 108 is cacheable or whether cached version 110 should be requested. As referenced above, not all webpages may be cacheable or may have updated cached versions 110.

In an embodiment, cache data 122 may include a determination that is based on a timeout of cached version 110. Cached version 110 may include a timeout value that indicates when a particular cached version 110 expires (e.g., is too old to provide to a user as a representation of secondary webpage 106). This timeout may be based on a determined change rate for secondary webpage 106. For example, various cached versions 110 of a particular secondary webpage 106 with different timestamps may be compared to one another to determine a change rate for the webpage.

Based on this change rate, the time when cached version 110 was stored, and the current time (e.g., when primary webpage 104 is requested), primary network server 118 may determine whether or not a timeout of cached version 110 has expired. For example, if cached version 110 was stored at 2:48 pm, the change rate is determined to be 3 hours, and primary webpage 104 is requested at 5:50 pm, primary network server 118 may determine that cached version 110 has expired. Alternatively, if primary webpage 104 is requested at 3:30 pm, cache data 122 may include a determination that cached version 110 is available and should be requested.

Cache data 122 may include an indication of which links 108 have corresponding (unexpired) cached versions 110 available, and for which links 108 cached versions 110 should be requested. For example, primary network server 118 may determine which cached versions 110 should be requested based on any number of factors, including identifying those links 108 a user is likely to select. For example, it may be shown that historically, a user selects one of the top three links in a list of search results a certain percentage, such as a majority, of the time. Then, for example, cache data 122 may include an indication for browser 102 to request cached versions 110 of the first three links 108 (if available).

In an embodiment, cache data 122 may include a simple Boolean, 1/0, true/false, or yes/no indication for links 108, identifying those cached versions 110 that should be requested by browser 102. Then, for example, based on cache data 122, browser 102 may request (or not request) the corresponding cached versions 110 from primary network server 118. Browser 102 may receive cached version 110 over network 116 and store it locally in a memory of computing device 114. Then, for example, when selection 105 is received, browser 102 may provide the locally stored cached version 110 (if available) of the requested secondary webpage 110 and request live version 112 from secondary network server 120 over network 116. Upon receipt of the data of live version 112, browser 102 may transition the user viewing cached version 110 to live version 112.

As shown in FIG. 1, live version 120 of secondary webpage 106 may be hosted by secondary network server 120, while cached version 110 of secondary webpage 106 may be remotely cached on primary network server 118. In an embodiment, primary network server 118 may be distinct from, or otherwise operate independently of secondary network server 120. In an embodiment, primary network server 118, in addition to providing cached version 110 of secondary webpage 106, may also provide or host primary webpage 104.

To reduce the likelihood of network delays when requesting a live version of a webpage, conventional browsers may pre-fetch live versions of each of the webpages from the network server hosting the webpages before the user selects one of the links. This approach, however, may unnecessarily consume the resources of the network server hosting the webpage (e.g., secondary network server 120), which may cause a degradation in performance of the server and consequently the browsing experience of users viewing secondary webpage 106.

Pre-fetching live versions of webpages comes with the inherent risk that a user never selects the link 108 for the pre-fetched webpage, and as such, may unnecessarily consume resources of servers designated to host or serve the requested webpages. Further, pre-fetching a live version of a webpage comes with another inherent risk that the live version of the webpage changes or is updated between the time of the pre-fetch and the time when a selection of the webpage is received. For example, a user may view a particular webpage for an extended period of time before making a selection of a link, during which time the live version of the pre-fetched webpage may have changed.

Providing a cached version 110 of secondary webpage 106 from a remote server (e.g., primary server 118) that does not directly host secondary webpage 106 may allow the resources of secondary network server 120 to be used to respond to requests for live version 112 responsive to known or received selections 105 for secondary webpage 106. In an embodiment, a website host may provide both primary network server 118 and secondary network server 120 to work in conjunction with one another. For example, while primary network server 118 periodically stores cached versions 110 of secondary webpage 106, secondary network server 120 responds to requests for live version 112.

Primary network server 118 and secondary network server 120 may be any computing devices that communicate over network 116. Primary network server 118 may be a server that stores cached version 110, while secondary network server 120 hosts live version 112. Servers 118 and 120 may include a collection of multiple servers, such as a server farm, and need not be standalone servers. Servers 118 and 120 may provide code, images and other information or network objects to browser 102 over network 116. In an embodiment, servers 118 and 120 may be partitioned portions of a single computing device.

Network 116 may be any communications network, including, but not limited to the Internet. Network 116 may be used to transmit or carry data between various devices (e.g., computing device 114, primary network server 118, and secondary network server 120).

Computing device 114 may be any computing device enabled to operate browser 102. Computing device 114 may be an electronic device that includes a processor and a memory. For example, computing device 114 may be a mobile phone, laptop computer, tablet computer, desktop computer, television, or other computing device with an electronic display. Computing device 114 may receive input from a user any number of ways including through a keyboard, over a touchscreen, or through sound or voice commands/prompts. Computing device 114 may be operatively connected to network 116 over which it (including browser 102) may request or receive information.

As referenced above, a user may open browser 102 on computing device 114, and may request primary webpage 104. In response to receiving the user's request, browser 102 may request primary webpage 104 from primary network server 118 over network 116. Primary network server 118 may provide the objects (e.g., DOM including links 108, images, text, and other multimedia) of primary webpage 104. Primary network server 118 may also provide cache data 122.

Upon receiving cache data 122, browser 102 may request cached versions 110 of secondary webpages 106 as indicated by cache data 122. While browser 102 is requesting/waiting for/receiving these cached versions 110 from primary network server 118, browser 102 may have rendered primary webpage 104 including links 108A-C.

Browser 102 may receive selection 105 of link 108A from a user. After receiving selection 105, browser 102 may determine whether cached version 110 of secondary webpage 106 corresponding to the selected link 108A has been received. If cached version 110 has been received, browser 102 may display, render, or otherwise provide cached version 110 responsive to selection 105. Browser 102 may simultaneously, substantially simultaneously, or otherwise in parallel with providing cached version 110 for display, request live version 112 from secondary network server 120.

While browser 102 is waiting to receive the data/objects corresponding to live version 112 over network 116, a user may view or interact with cached version 110, which may have been previously requested and stored locally on computing device 114. As referenced above, cached version 110 may or may not include a full representation of secondary webpage 106. As such, browser 102 may provide cached version 110 with any range of functionality, depending for example, on how much or which portion(s) of secondary webpage 106 has been cached. In an embodiment, browser 102 may provide cached version 110 as a read-only version of secondary webpage 106. In another embodiment, cached version 110 may be provided with full functionality, allowing a user to select any links 108 that may appear in cached version 110. User interactions with cached version 110 (e.g., such as a selection of a hyperlink on cached version 110) may be directed by browser 102 to secondary network server 120 or another identified network server for processing.

In an embodiment, browser 102 may provide cached version 110 with one or more visual indicators indicating to the user that the user is currently viewing a cached version 110 of the selected secondary webpage 106. Examples of visual indicators include providing cached version 110 in a grey scale or with another color distortion, with a status-bar indication that a cached version is displayed, or other visual indicator.

When browser 102 receives live version 112, browser 102 may update cached version 110 with live version 112, or otherwise transition from cached version 110 to live version 112. In an embodiment, browser 102 may determine the differences between cached version 110 and live version 112 and update only those portions displayed in cached version 110 that vary from live version 112. In another embodiment, browser 102 may swap all of cached version 110 with live version 108. For example, in a single transaction browser 102 may replace cached version 110 with live version 112. Upon completion of the update, browser 102 will render a version of secondary webpage 106 that is visually and functionally identical to live version 112.

In an embodiment, browser 102 pre-fetches remotely-stored cached versions 110 of webpages prior to receiving user selections 105 for those webpages. In pre fetching remotely-stored cached versions 110 of secondary webpages 106, browser 102 is able to enhance the user browsing experience by providing the locally stored cached versions 110 to a user upon receipt of a selection 105 for the webpage 106.

Rather than forcing a user to wait for receipt of live version 112, browser 102 enables a user to view and interact with cached version 110 of secondary webpage 106 while live version 112 is requested and loaded as a background process. Upon a receipt of live version 112, browser 102 may transition from cached version 110 to live version 112.

Figure 2:
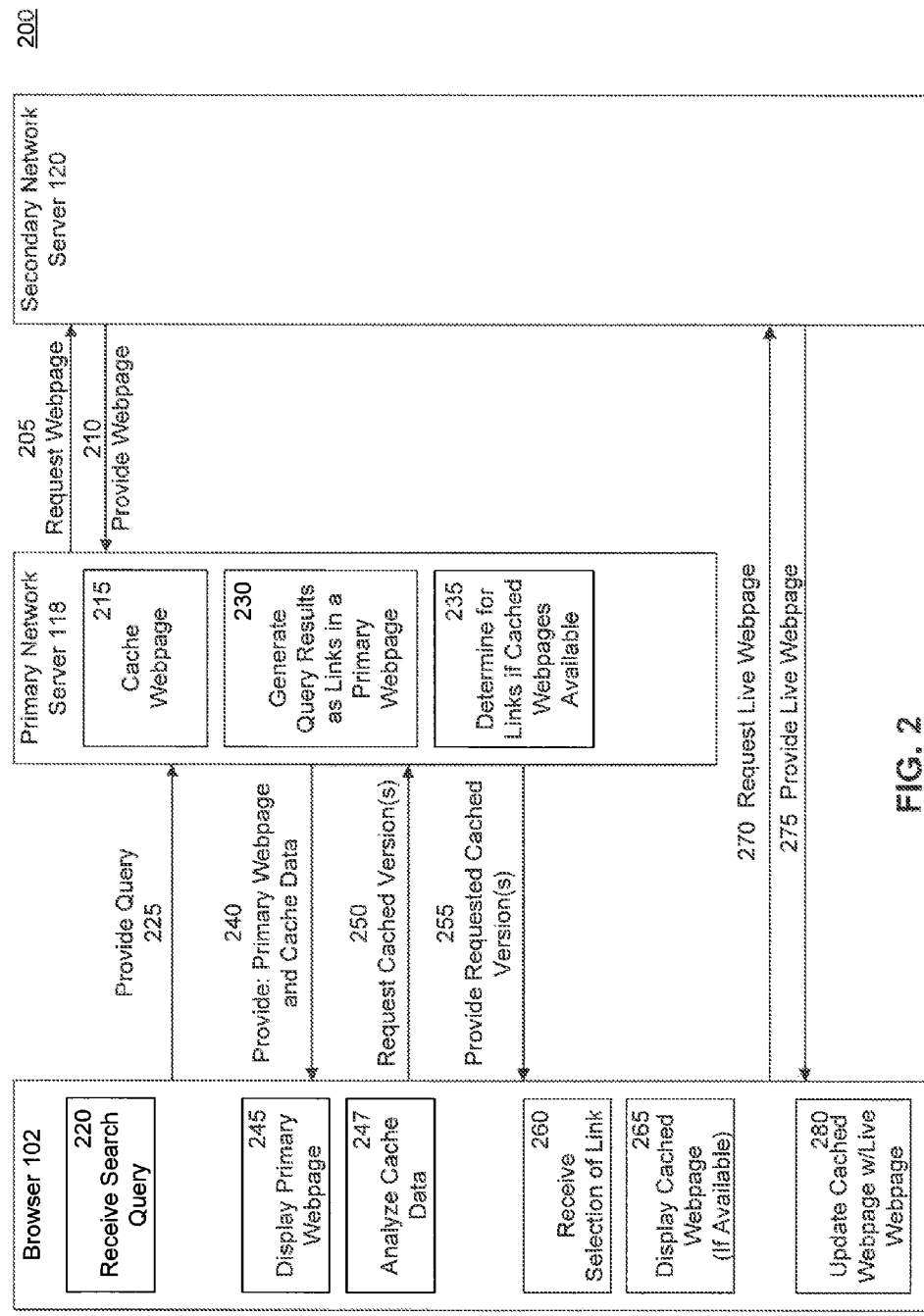
FIG. 2 is a flow chart of a process of transitioning between remotely cached and live versions of a webpage, according to an example embodiment.

FIG. 2 is a flowchart of a method for transitioning between remotely cached and live versions of a webpage, according to an embodiment. The stages of FIG. 2 are described below, in non-limiting examples, with reference to FIG. 1.

At stage 205, primary network server 118 requests a webpage from secondary network server 120. In an embodiment, the request may be based on one or more links 108 present in a webpage stored on primary network server 118. At stage 210, secondary network server 120 responds to request 205 by providing live version 112 of the requested webpage. At stage 215, primary network server 118 stores a cached version 110 of the webpage. Primary network server 118 may periodically request (205) live versions from secondary network server 120 and update cached version 110 with the most-recently requested live version 112.

At stage 220, browser 102 may receive a search query. For example, a user may be viewing a particular webpage and may enter a search query that is received by browser 102 at stage 220. At stage 225, browser 102 may provide the query to primary network server 118.

At stage 230, primary network server 118 may generate query results as links 108 in primary webpage 104. For example, primary webpage 104 may include a list of links 108 to webpages or other documents that correspond or are otherwise related to the term(s) queried by the user. Each entry of the list may correspond to a different link 108 on primary webpage 104.

At stage 235, primary network server 118 may determine whether cached versions 110 of one or more webpages corresponding to the links 108 are available and unexpired. Primary network server 118 may also determine an anticipated likelihood of a user selecting links 108. This likelihood may be determined based on previous results or queries and actions performed by the requesting user or other users. This information may be provided as cache data 122, indicating which cached versions 110 browser 102 should request. At stage 240, primary network server 118 may provide primary webpage 104 including links 108 and cache data 122 to browser 102. In another embodiment, primary webpage 104 and cache data 122 may be provided to browser 102 separately.

At stage 245, browser 102 may display or render primary webpage 104 including links 108. At stage 247, browser 102 may analyze cache data 122 to determine for which secondary webpage(s) 106 to request cached versions 110. At stage 250, browser 102 may request the cached versions 110, and at stage 244, primary network server 118 may provide the requested cached versions 110 over network 116.

At stage 260, browser 102 receives selection 105 of a link 108 from a user. In other embodiments, selection 105 may be received prior to stages 247, 250, or 255. For example, browser 102 may display primary webpage (245) and immediately receive selection 105, prior to analyzing cache data 122. At stage 265, browser 102 may determine whether a cached version 110 of the requested website has been received. If the cached version 110 has been received (e.g., is stored locally on computing device 114) and has not timed-out or otherwise expired, at stage 265 browser 102 may display cached version 110. If, however, only a portion of cached version 110 has been received, browser 102 may display the received portion or not display the received portion of the cached version 110.

At stage 270, which may be performed substantially simultaneously with or otherwise in parallel with stage 265 (after receipt of selection 105 at stage 260), browser 102 may request live version 112 of secondary webpage 106. At stage 275, secondary network server 120 provides live version 112 to browser 102 over network 116. At stage 280, browser 102 may transition from cached version 110 to live version 112.

Any type of transitioning may occur between providing cached version 110 and providing live version 112. Cached version 110 may or may not include visual indicators (e.g., greyed area, notification/status as cached version) indicating that user is viewing cached version 110. Upon completion of the transition, browser 102 will display elements visually identical to live version 112. The transition may occur piece-by-piece as elements of live version 112 are received such that corresponding elements of cached version 110 are replaced, or all at once upon receipt of all the elements/data of live version 112.

Transitioning from cached version 110 to live version 112 may be performed any number of ways. In an embodiment, cached version 110 may be displayed on browser 102 with a visual indication that a cached version of secondary webpage 106 is displayed. For example, browser 102 may display cached version 110 with one or more portions partially/fully greyed out. Then, for example, transitioning from cached versions 110 may occur by replacing the greyed elements of cached version 110 with received full-color elements of live version 112.

In an embodiment, cached version 110 may be provided with only limited functionality. For example, any links 108 that may exist on secondary webpage 106 may be deactivated while cached version 110 is displayed. As such, the user may view cached version 110 but may have limited interaction with the elements of cached version 110. For example, if a user selects a deactivated link 108, then the user may get no response or an indication that the user is currently viewing cached version 110. As such, transitioning from cached version 110 may involve activating the links 108, such that upon a subsequent selection by the user, browser 102 will load the requested webpage.

In another embodiment, cached version 110 may appear as a normal webpage.

Then, for example, transitioning from cached version 110 to live version 112 may involve replacing cached version 110 with live version 112. For example, as live version 112 is received by browser 102. Browser 102 may render live version 112 in a cache or memory of computing device 114. Then for example, upon receipt of live version 112, browser 102 may replace cached version 110 with live version 112. In an embodiment, browser 102 may wait until a certain percentage of live version 112 is received, such as 60%, before replacing cached version 110 with live version 112, and may render the remaining portion of live version 112 as it is received.

Figure 3:
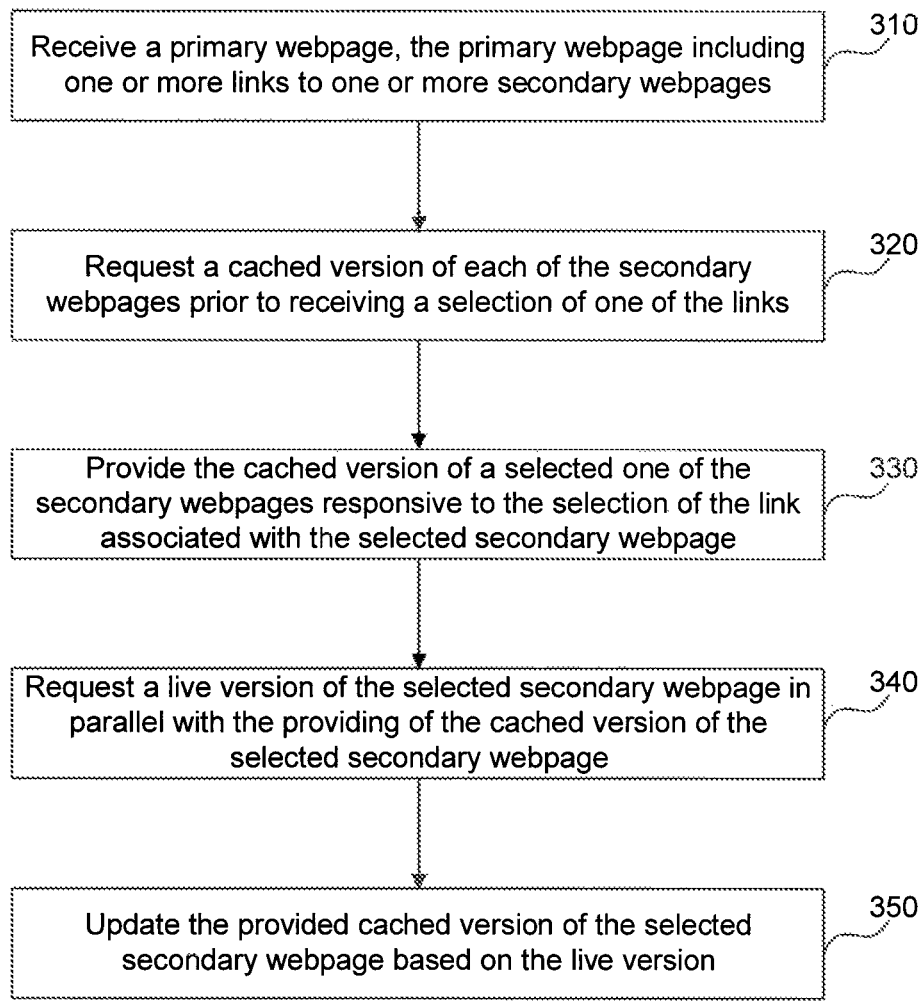
FIG. 3 is a flow chart of a process of transitioning between remotely cached and live versions of a webpage, according to another example embodiment.

FIG. 3 is a flowchart of another method for transitioning between remotely cached and live versions of a webpage, according to an embodiment. The stages of FIG. 3 are described below, in non-limiting examples, with reference to FIG. 1.

At stage 310, a primary webpage is received from a primary server, the primary webpage including one or more links to one or more secondary webpages. For example, browser 102 may receive primary webpage 104 including links 108A-C to one or more secondary webpages 106. In another embodiment, links 108 may correspond to webpages that are anticipated to be selected by a user. For example, when a user types an HTTP (hypertext transfer protocol) address in the address bar of a browser 102, browser 102 may include functionality that anticipates likely webpages the user may desire to view (e.g., based on the browsing history and previous entries of the user). As the user types the address, browser 102 may adjust the anticipated webpages accordingly. Then, for example, cached versions 110 of those corresponding webpages may be requested as described in greater detail at stage 320.

At stage 320, a cached version of each of the secondary webpages is requested from the primary server prior to receiving a selection of one of the links. For example, browser 102 may request cached versions 110 of secondary webpages 106 corresponding to one or more of links 108. In an embodiment, browser 102 may analyze cache data 122 and determine that links 108A and 108B are the most likely to be selected by a user, and may request cached versions 110 of those webpages.

At stage 330, the cached version of a selected one of the secondary webpages is provided responsive to the selection of the link associated with the selected secondary webpage. For example, browser 102 may receive selection 105 for link 108A, for which a cached version 110 has been received. Browser 102 may then display cached version 110 on computing device 114.

In an embodiment, prior to displaying cached version 110, browser 102 may determine whether a timeout of cached version 110 has expired. If the timeout has not expired, browser 102 may provide cached version at stage 330. Or, for example, if the timeout of cached version 110 has expired, or cached version 110 is otherwise unavailable, cached version may not be provided at stage 330.

At stage 340, a live version of the selected secondary webpage is requested from a secondary server in parallel with the providing of the cached version of the selected secondary webpage. For example, browser 102 may request live version 112 from secondary network server 120 while cached version 110 is rendered for a user.

At stage 350, the provided cached version of the selected secondary webpage is updated based on the live version. For example, browser 102 may replace cached version 110 with live version 112. In another embodiment, browser 102 may replace only those portions of cached version 110 that differ from corresponding portions of live version 112 such that upon a completion of the update, browser 102 renders a version of secondary webpage 106 identical to live version 112.

Figure 4:
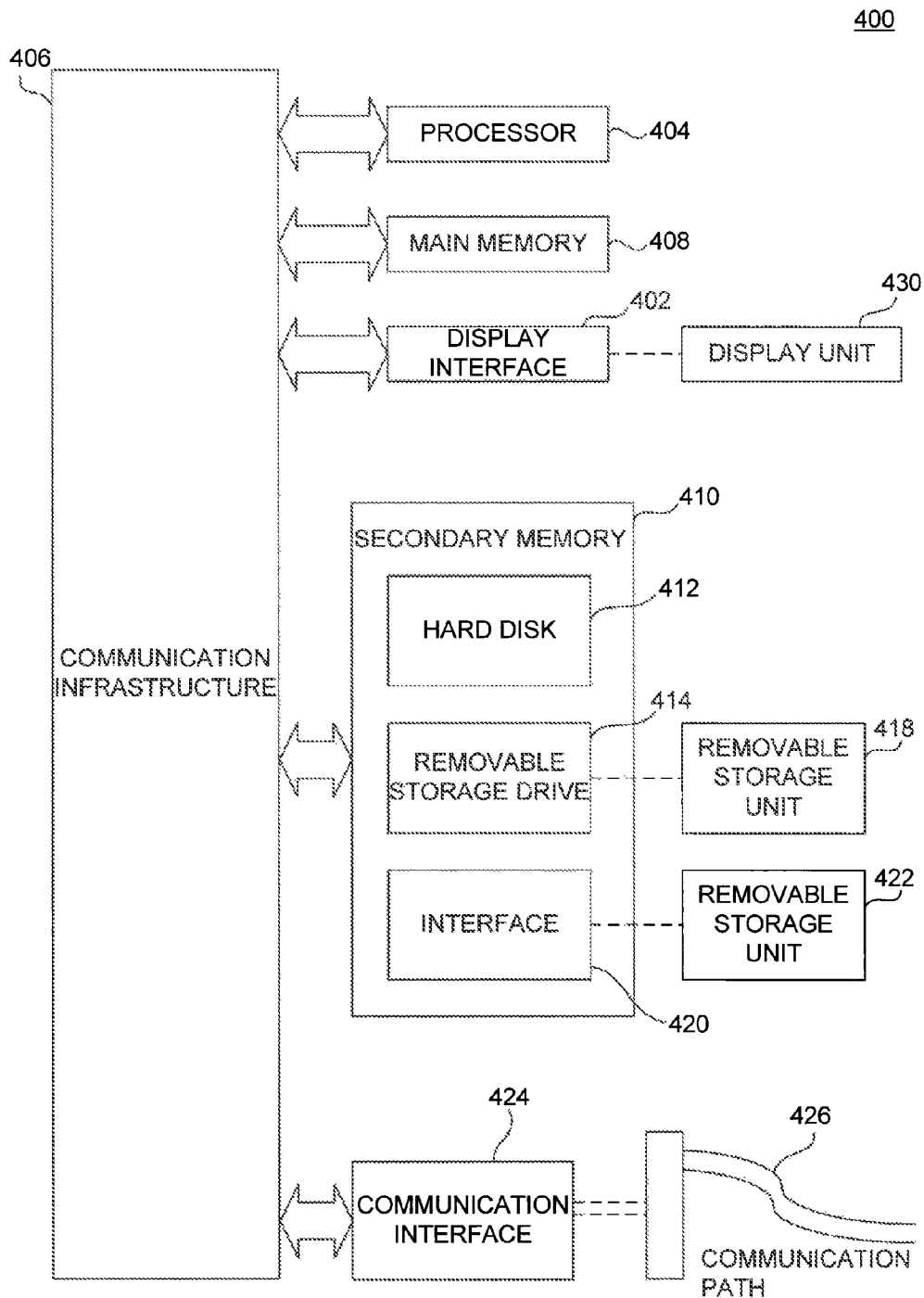
FIG. 4 is a system diagram that can be used to embody or implement embodiments described herein.

FIG. 4 illustrates an example computer system 400 in which embodiments as described herein, or portions thereof, may be implemented as computer-readable code. For example, computing device 104, primary network sever 118, and secondary network server 120, and methods 200 and 300, including portions thereof, may be implemented in computer system 400 using hardware, software, firmware, tangible computer readable media having instructions stored thereon, or a combination thereof and may be implemented in one or more computer systems or other processing systems. If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. The memory may include any non-transitory memory. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the embodiments using other computer systems and/or computer architectures. Although some operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system may be operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Main memory may include any kind of tangible memory. Secondary memory 410 may include, for example, a hard disk drive 412, removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored therein computer software and/or data.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 430.

In alternative implementations, secondary memory 410 may include other similar I/O ways for allowing computer programs or other instructions to be loaded into computer system 400. Such as a removable storage unit 422 and an interface 420. Examples may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of non-storage signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 418, removable storage unit 422, and a hard disk installed in hard disk drive 412. Such medium includes non-transitory storage mediums. Computer storage medium and computer readable storage medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement embodiments as discussed herein. Where the embodiments are implemented using software, the software may be stored in a computer program product and loaded into computer system 400 using removable storage drive 414, interface 420, and hard disk drive 412, or communications interface 424.

Embodiments also may be directed to computer program products comprising software stored on any computer readable medium. Such software, when executed in one or more data processing device, causes a data processing device(s) to operate as described herein. Embodiments may employ any computer readable storage medium. Examples of computer readable storage mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The Summary and Abstract sections may set forth one or more but not all exemplary embodiments contemplated, and thus, are not intended to limit the described embodiments or the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept as described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described examples, but should be defined only in accordance with the following claims and their equivalents.

What is claimed is:

1. In at least one computer having at least one processor and one memory, a computer-implemented method, performed by the at least one processor, comprising:
   receiving a primary webpage, the primary webpage including a link to a secondary webpage;
   requesting a cached version of the secondary webpage prior to receiving a selection of the link, wherein the cached version includes a previous version of the secondary webpage;
   providing the cached version of the secondary webpage responsive to the selection of the link;
   requesting a live version of the secondary webpage in parallel with the providing of the cached version of the secondary webpage; and
   transitioning from the provided cached version of the secondary webpage to the live version, wherein upon a completion of the transitioning, the live version of the selected secondary webpage is provided.

2. The method of claim 1, wherein the requesting a cached version comprises:
   determining that the primary webpage includes links to a plurality of secondary webpages;
   determining that at least a subset of the plurality of secondary webpages is cacheable based on cache data; and
   requesting a cached version of each of the cacheable secondary webpages of the subset.

3. The method of claim 2, wherein the determining that at least the subset is cacheable comprises:
   determining that a timeout for providing the cached version of a respective one of the secondary webpages has not expired, wherein the timeout indicates when the cached version of the respective webpage is not to be provided responsive to the selection of the link; and
   requesting the cached version of the secondary webpages for which the respective timeout has not expired, prior to receiving the selection of the link.

4. The method of claim 1, wherein the providing comprises:
   determining that the cached version of the secondary webpage has been received.

5. The method of claim 1, wherein the providing comprises:
   determining that the cached version of the secondary webpage is unavailable;
   requesting the live version of the secondary webpage; and
   providing the requested live version in lieu of the cached version of the secondary webpage.

6. The method of claim 5, wherein the determining comprises:
   determining that the cached version of the secondary webpage has not been received or has only been partially received.

7. The method of claim 5, wherein the determining comprises:
   determining that the secondary webpage is uncacheable.

8. The method of claim 1, wherein the providing comprises:
   providing the cached version of the secondary webpage, wherein the provided cached version includes one or more visual indicators indicating that the cached version of the secondary webpage is being provided.

9. The method of claim 1, wherein the transitioning comprises:
   replacing the provided cached version of the secondary webpage with the live version.

10. The method of claim 9, wherein the replacing comprises:
    replacing one or more portions of the cached version of the secondary webpage with one or more portions of the live version, wherein the replaced portions of the cached version differ from the corresponding one or more portions of the live version.

11. The method of claim 1, wherein the transitioning comprises:
    determining that there are one or more differences between the provided cached version of the secondary webpage and the corresponding live version of the secondary webpage; and
    updating the provided cached version of the secondary webpage based on the live version, wherein upon a completion of the updating, there are fewer differences between the provided cached version of the secondary webpage and the corresponding live version of the secondary webpage.

12. A system comprising:
    a processor; and
    a memory coupled to the processor, the memory configured to store instructions that when executed by the processor cause the processor to:
      receive a primary webpage from a primary server, the primary webpage including a link to a secondary webpage;
      request a cached version of the secondary webpage from the primary server prior to receiving a selection of the link by a user, wherein the cached version includes a previous version of the secondary webpage;
      provide the cached version of the secondary webpages responsive to the selection of the link;
      request a live version of the secondary webpage from a secondary server in parallel with the providing of the cached version of the secondary webpage, wherein the secondary server is configured to operate independent of the primary server; and
      update the provided cached version of the secondary webpage based on the live version, wherein upon a completion of the update, the live version of the secondary webpage replaces the cached version.

13. The system of claim 12, wherein the instructions to update comprise instructions that when executed cause the processor to:

determine that there are one or more differences between the provided cached version of the secondary webpage and the corresponding live version of the secondary webpage; and update the differences in the provided cached version of the secondary webpage with corresponding differing portions of the live version of the secondary webpage.

14. The system of claim 12, wherein the instructions to receive comprise instructions that when executed cause the processor to:

determine that the primary webpage includes links to a plurality of secondary webpages;

determine that at least a subset of the plurality of secondary webpages are cacheable; and request a cached version of each of the secondary webpages of the subset.

15. The system of claim 12, wherein the instructions to provide comprise instructions that when executed cause the processor to:

determine that the cached version of the secondary webpage is unavailable;

request the live version of the secondary webpage; and provide the requested live version in lieu of the cached version of the secondary webpage.

16. The system of claim 15, wherein the instructions to determine that the cached version of the secondary webpage is unavailable comprise instructions that when executed cause the processor to:

determine that, at least one of, the cached version of the secondary webpage has not been received, the cached version of the secondary webpage has only been partially received.

17. The system of claim 15, wherein the instructions to determine that the cached version of the secondary webpage is unavailable comprise instructions that when executed cause the processor to:

determine that the secondary webpage is uncacheable.

18. The system of claim 12, wherein the instructions to update comprise instructions that when executed cause the processor to:

replace one or more portions of the provided cached version of the secondary webpage with one or more portions the live version, wherein the replaced one or more portions of the provided cached version differ from the corresponding one or more portions of the live version.

19. The system of claim 12, wherein the instructions to request the cached version comprise instructions that when executed cause the processor to:

store the requested cached version in the memory of the local computing device prior to receiving the selection.

20. A non-transitory computer-readable storage medium storing instructions that, when executed by a computer, cause the computer to perform a method comprising:

receiving a primary webpage of search results to a query, the primary webpage including a link to a secondary webpage corresponding to the search results;

requesting a cached version of the secondary webpage prior to receiving a selection of the link, wherein the cached version includes a previous version of the secondary webpage;

providing the cached version of the secondary webpage for display on a browser, responsive to the selection of the link associated with the secondary webpage;

requesting a live version of the secondary webpage in parallel with the providing of the cached version of the secondary webpage for display; and updating the one or more portions of the displayed cached version of the secondary webpage with one or more portions of the live version, wherein the updated portions of the cached version differ from the corresponding portions of the live version, and wherein upon a completion of the updating, the displayed secondary webpage is identical to the live version.

21. The non-transitory computer-readable storage medium of claim 20, wherein the providing comprises:

determining that the cached version of the secondary webpage is unavailable;

requesting the live version of the secondary webpage; and providing the requested live version in lieu of the cached version of the secondary webpage.

22. The non-transitory computer-readable storage medium of claim 21, wherein the determining comprises:

determining that the cached version of the secondary webpage has not been received or has only been partially received.

23. The non-transitory computer-readable storage medium of claim 21, wherein the determining comprises:

determining that the secondary webpage is uncacheable.

* * * * *